Aug. 12, 1924.
G. F. LONG
PEDAL
Filed Aug. 14, 1922
1,504,695
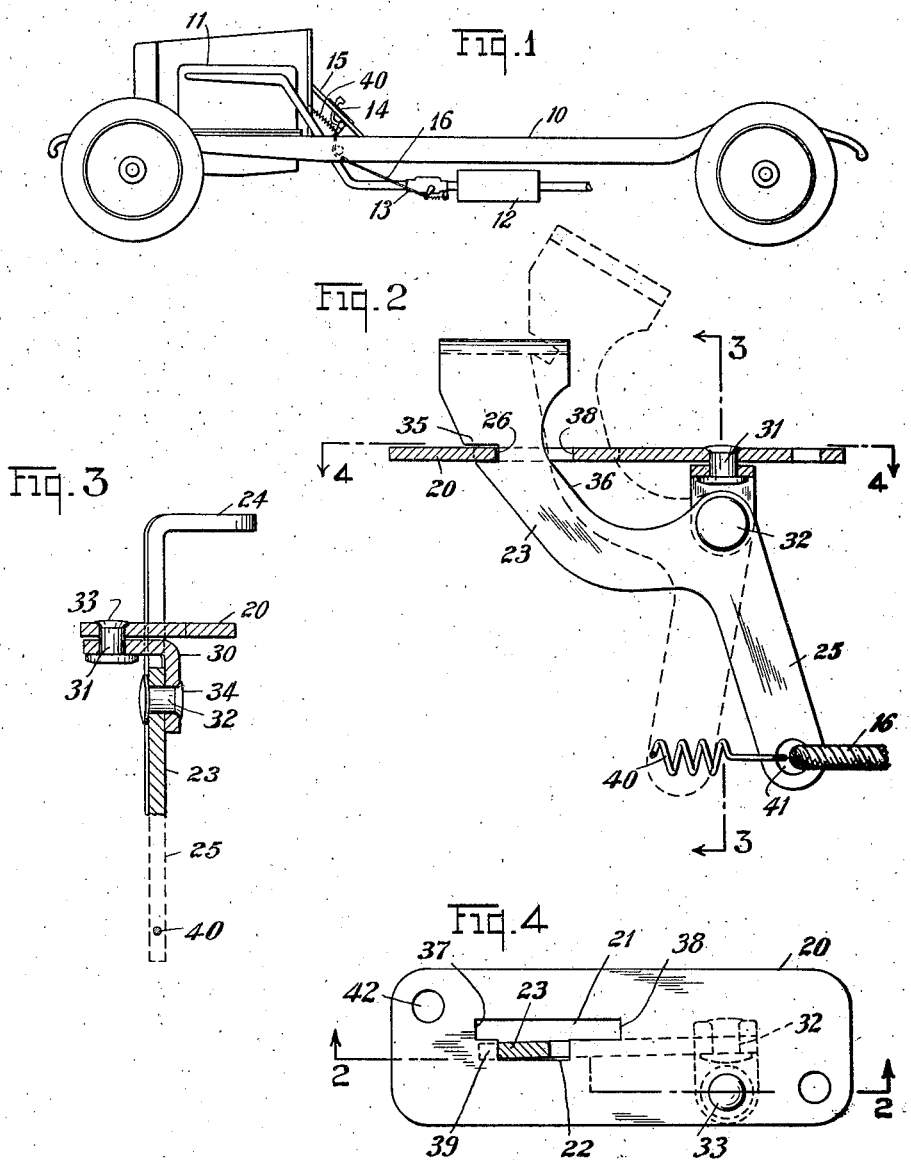
George F. Long, Inventor
By his Attorney
Albert M. Austin Patented Aug. 12, 1924.

1,504,695

UNITED STATES PATENT OFFICE.

GEORGE F. LONG, OF NEW YORK, N. Y.

PEDAL.

Application filed August 14, 1922. Serial No. 581,705.

*To all whom it may concern:*

Be it known that I, GEORGE F. LONG, a citizen of the United States, and resident of New York city, in the county of Queens and State of New York, have invented certain new and useful Improvements in Pedals, of which the following is a specification.

The invention relates to an improved pedal actuated control mechanism for operating a device spaced from the control mechanism. The present embodiment of the invention is adapted especially for the control of a muffler cut-out which may be located in the exhaust pipe line of an explosive engine and operated from the footboard of an automotive vehicle, such as an automobile, motor boat or other conveyance.

The invention relates broadly to a very simple, compact and economical control mechanism, comprising only a few parts which can be made of light punched metal and may be easily assembled.

The control mechanism is necessarily located where it can be actuated by the driver or operator of the vehicle or conveyance and it is connected with the muffler cut-out, which is necessarily placed in the exhaust pipe line of the engine. Conventional types of cut-out comprise a valve member which is rotated to direct the exhaust gases either with the muffler or into the air, and this valve is always under the tension of a strong spring which must be distended in order to change the position of the valve, and the pedal mechanism is adapted for use with such valve mechanisms, as will appear from the following description.

Referring to the drawings:

Figure 1 shows a form of the invention applied to a conventional type of automotive vehicle;

Figure 2 shows a side elevation partly in section of a pedal operated mechanism therefor, shown in its depressed position;

Figure 3 is a section on the line 3—3 of Figure 2;

Figure 4 is a section taken on the line 4—4 of Figure 2.

An automotive vehicle of conventional type is shown diagrammatically in Figure 1 as comprising a frame 10, and a prime mover 11, which may be a suitable well-known type of combustion engine. Such combustion engine by its periodic expulsion of exhaust vapors, usually causes the formation of a series of compressional waves, and for the purpose of muffling or deadening these compressional waves there may be provided a muffler 12. For providing a direct path of escape to the atmosphere, there may be inserted in the exhaust pipe between the engine and the muffler a suitable form of muffler cut-out valve 13. In the conventional type of automotive vehicle this cut-out is necessarily positioned on a portion of the vehicle remote from the operator's seat. Accordingly it is desirable to provide a pedal actuated control mechanism to operate the valve and in Figure 1 this pedal mechanism 14 is shown positioned upon a portion of the floor board 15 of the vehicle convenient to the operator. The pedal mechanism 14 may be connected to the device to be operated thereby by means of an operating cable 16.

The pedal actuated control mechanism of the present invention comprising a base plate 20 is preferably formed of a substantially flat metal rectangular in shape. This metal base plate is provided with a slot 21 extending longitudinally thereof and having a lateral notch 22. Extending through the notch is a pedal arm 23 preferably of stamped metal and having at its upper end a laterally bent portion 24 and a downwardly extending portion 25. Along one side of the portion of the arm 23 which extends through the slot 21, there is provided a notch 26 for a purpose which will be subsequently set forth.

For pivotally and swivelly supporting the pedal arm 23 there is provided an angle bracket 30 which is loosely pinned to the lower face of the base plate 20 by means of a pivot pin 31. The lower end of the pivot pin 30 is preferably provided with a head of large dimensions for maintaining the bracket 30 in position and for providing a bearing surface of relatively large area. The pin 31 extends through the plate 20 and its upper end is peened over to fasten the pin thereto. The pedal arm 23 is similarly loosely pinned to the bracket 30 by means of a pivot pin 32, having an enlarged head on one end to engage the pedal arm. The end 34 of the pin 32 is peened over so as to fasten the respective pins to the plate 20 and the bracket 30. The position of the pin 31 with respect to the slot 21 and the notch 22 is such that the pedal arm 23 may ride freely through the slot 21, being limited in its movement therein by the edges 35—36 of the pedal arm 23 coming in contact with the ends 37—38, respectively, of the slot 21. Furthermore, the arrangement is such that the pedal arm 23 and the bracket 30 may oscillate upon the pin 31 so that the shank of the pedal arm may move into the notch 22 when the pedal arm is in its downward position, as shown in Figure 2. When thus oscillated, and when the shank of the pedal arm 23 is positioned in the lateral notch 22, the notch 26 of the pedal arm engages the portion 39 of the face plate 20.

For normally maintaining the cut-out in its closed position and the pedal arm 23 in an upper position such as represented by the dotted line of Figure 2, there may be provided a suitable coil spring 40 which may be positioned in any convenient position, either near the cut-out 13 or as shown, near the control mechanism 14. In the latter case one end of the spring 40 may be looped into and fastened in an aperture 41 of the lower end of the downward extending portion 25 of the pedal arm 23. The cable 16 may also be fastened in the aperture 41, as clearly shown in Figure 2.

In order to secure the base plate 20 to the floor board 15 or other suitable mounting, there may be provided two or more screw holes such as 42 through which fastening means such as wood screws may be extended.

The operation of the device will be clear from the foregoing description. It will be seen that in the normal position of the device the cut-out 13 is closed and the noise of the engine is muffled by the muffler 12 provided for that purpose. In order to cut out the muffler for the purpose of more easily observing the operation of the engine or for other purposes, the operator of the vehicle may depress the pedal arm 23 by placing his foot upon the laterally bent portion 24. When the pedal arm reaches the position shown by the full lines of 22 the notch 26 of the arm automatically engages the solid portion 39 of the base plate 20, thus maintaining the pedal arm in its lowermost position. In order to release the pedal it is only necessary to give it a kick towards the slot 21 whereupon the spring 40 will cause it to rotate upon the pin 32 to its original position.

Thus it will be seen that I have provided a pedal operated control mechanism of simple and efficient design in which a minimum of parts are required. By means of the simple angle bracket provided a double or swivel motion is imparted to the pedal arm, the oscillation in one plane serving to control the operating movements of the remote device and oscillation in the other plane serving to lock the mechanism in displaced position. The control mechanism may readily be restored from its displaced position by merely giving it a short sidewise motion which disengages the moving parts and permits the retractive means to become effective.

While I have shown and described and have pointed out in the annexed claims certain novel features of my invention, it will be understood that various omissions, substitutions and changes in the form and details of the device illustrated and in its operation may be made by those skilled in the art without departing from the spirit of my invention.

Having described my invention, I claim:

1. In a pedal actuated control mechanism for a cut-out, the combination with a pedal arm, of a base plate having a slot through which a portion of the pedal arm oscillates, said slot having a lateral notch for engaging the pedal arm in one of its positions, and means pivotally secured to said plate for supporting the arm.

2. In a pedal actuated control mechanism for a cut-out, the combination with a pedal arm, of a base plate having a slot through which a portion of the pedal arm oscillates, said slot having a lateral notch for maintaining the pedal arm in one of its positions, and means pivotally secured to said plate for supporting the arm.

3. In a pedal actuated control mechanism for a cut-out, the combination with a pedal arm, of a base plate having a slot through which a portion of the pedal arm oscillates, said slot having a lateral notch for engaging the pedal arm in one of its positions, and a bracket pivotally mounted on one face of the base member for supporting the pedal arm.

4. In a pedal actuated control mechanism for a cut-out, a pedal arm movable in one plane to control the cut-out and in a different plane to lock the control mechanism in displaced position, and a single spring for retracting the control mechanism and for maintaining the pedal arm in locked position.

5. In a pedal actuated control mechanism for a cut-out, a pedal arm movable in one plane to control the cut-out and in a plane at an angle to the first mentioned plane to lock the mechanism in displaced position, and a single spring for retracting the control mechanism and for maintaining the pedal arm in locked position.

6. In a pedal actuated control mechanism for a cut-out, a pedal arm movable in one plane to control the cut-out and in a different plane to lock the control mechanism in displaced position, and means for swivelly mounting the pedal arm.

7. In a pedal actuated control mechanism for a cut-out, a pedal arm having a motion in one plane to control the cut-out and a motion in a different plane to lock the control mechanism in displaced position, a base plate, and means pivotally secured to the base plate for supporting the pedal arm to permit motion thereof in both of said planes.

8. In a pedal actuated control device for a cut-out, a pedal arm movable in one plane to control the cut-out and movable in a different plane to lock the device in displaced position, a base plate, and an angle bracket for supporting the pedal arm on said base plate to permit motion thereof in both of said planes.

9. In a pedal actuated control device for a cut-out, a pedal arm movable in one plane to control the cut-out and movable in a different plane to lock the device in displaced position, a base plate, and an angle bracket loosely mounted on said base plate for swivelly securing the pedal arm to the base plate, arranged to oscillate with said pedal arm when the pedal arm is being locked or unlocked.

Signed at Long Island City, in the county of Queens and State of New York, this 1st day of August, A. D. 1922.

GEORGE F. LONG.